(12) United States Patent
Udupa et al.

(10) Patent No.: US 11,979,318 B2
(45) Date of Patent: May 7, 2024

(54) EGRESS TRAFFIC ENGINEERING IN PUBLIC CLOUDS WITH COMMODITY ROUTERS ON THE WAN EDGE

(71) Applicant: Microsoft Technology Licensing, LLC, Redmond, WA (US)

(72) Inventors: Abhishek Udupa, Bellevue, WA (US); Sharad Agarwal, Seattle, WA (US); Ryan Andrew Beckett, Redmond, WA (US); Rachee Singh, Redmond, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 458 days.

(21) Appl. No.: 17/397,560

(22) Filed: Aug. 9, 2021

(65) Prior Publication Data

US 2023/0041081 A1 Feb. 9, 2023

(51) Int. Cl.
*H04L 45/586* (2022.01)
*H04L 43/0852* (2022.01)
*H04L 45/02* (2022.01)
*H04L 45/121* (2022.01)
*H04L 45/76* (2022.01)

(52) U.S. Cl.
CPC ........ *H04L 45/586* (2013.01); *H04L 43/0858* (2013.01); *H04L 45/04* (2013.01); *H04L 45/121* (2013.01); *H04L 45/76* (2022.05)

(58) Field of Classification Search
CPC ..... H04L 45/586; H04L 45/04; H04L 45/121; H04L 45/76; H04L 45/655; H04L 45/42; H04L 45/70; H04L 43/0858
See application file for complete search history.

(56) References Cited

U.S. PATENT DOCUMENTS

| | | | |
|---|---|---|---|
| 11,038,953 B1 * | 6/2021 | Nayak | H04L 45/70 |
| 2008/0062891 A1 * | 3/2008 | Van der Merwe | H04L 45/22 370/254 |
| 2019/0014038 A1 * | 1/2019 | Ritchie | H04L 12/4675 |

(Continued)

OTHER PUBLICATIONS

Brandon Schlinkler et al. "Engineering Egress with Edge Fabric", Proceedings of the Conference of the ACM Special Interest Group/ on Data Communication, SIGGCOM '17, ACM Press, Aug. 17, 2017, pp. 418-431, ISBN: 978-1-4503-4653-5. (Year: 2017).*

(Continued)

*Primary Examiner* — Redentor Pasia
(74) *Attorney, Agent, or Firm* — ArentFox Schiff LLP

(57) ABSTRACT

The present application relates to egressing traffic from a public cloud network. An egress traffic manager configures routing at hosts and edge routers within the public cloud network. The egress traffic manager determines, for an edge router, a plurality of current border gateway protocol (BGP) sessions with external networks. The egress traffic manager configures a virtual router hosted on the edge router to route a portion of egress traffic to a selected one of the external networks via one of the BGP sessions. A host is configured to route the portion of egress traffic within the public cloud network to the edge router. An edge router configured to route, by the virtual router, the portion of egress traffic from the edge router to the selected one of the external networks.

20 Claims, 6 Drawing Sheets

(56) References Cited

U.S. PATENT DOCUMENTS

| | | | |
|---|---|---|---|
| 2019/0036733 A1* | 1/2019 | Feldpusch | H04L 61/103 |
| 2020/0028758 A1* | 1/2020 | Tollet | H04L 45/586 |
| 2021/0135991 A1* | 5/2021 | Dickinson | H04L 12/4633 |
| 2022/0006726 A1* | 1/2022 | Michael | H04L 45/24 |
| 2023/0179517 A1* | 6/2023 | Qian | H04L 45/586 |
| | | | 370/392 |
| 2023/0224278 A1* | 7/2023 | Iqbal | H04L 63/0236 |
| | | | 726/15 |
| 2023/0344748 A1* | 10/2023 | Prajapat | H04L 12/1877 |

OTHER PUBLICATIONS

"International Search Report and Written Opinion Issued in PCT Application No. PCT/US22/037950", dated Oct. 21, 2022, 13 Pages.

Schlinker, et al., "Engineering Egress with Edge Fabric: Steering Oceans of Content to the World", In Proceedings of the Conference of the ACM Special Interest Group on Data Communication, Aug. 7, 2017, pp. 418-431.

Singh, et al., "Cost-Effective Cloud Edge Traffic Engineering with CASCARA", In Proceedings of 18th USENIX Symposium on Networked Systems Design and Implementation, Apr. 12, 2021, pp. 201-216.

* cited by examiner

EGRESS TRAFFIC ENGINEERING IN PUBLIC CLOUDS WITH COMMODITY ROUTERS ON THE WAN EDGE

BACKGROUND

A cloud provider may host cloud applications for its clients. The cloud provider offers various methods and services to accelerate development of the application development time. For example, a cloud provider may provide infrastructure as a service (IaaS) services such as virtual machines (VM), platform as a service (PaaS) services such as databases and serverless computing, and software as a service (SaaS) services such as authentication platforms.

A public cloud network may be implemented on a wide area network that includes computing resources spread across a geographic region and connected via communication links such as fiber optic cables. The size of wide area networks may vary greatly from a small city to a global network. For example, a WAN may connect multiple offices of an enterprise, the customers of a regional telecommunications operator, or a global enterprise. The computing resources and connections within a WAN may be owned and controlled by the WAN operator.

Clients of the cloud provider may obtain access to the public cloud network or WAN via the Internet. A path between the client and the public cloud network may include one or more Internet Service Providers (ISPs). In general, traffic traversing the Internet may be routed on a lowest cost basis. Accordingly, neither the client network nor the WAN may have significant control of routing decisions between the partner network and the WAN. From the perspective of the client, however, the performance of the public cloud network may depend on a round trip time from the client to a host in the public cloud network and back to the client. Accordingly, there is a need to improve routing in a public cloud network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, the disclosure provides a system for egressing traffic from a public cloud network. The system includes an egress traffic manager, at least one host, and at least one edge router. The egress traffic manager includes a memory storing one or more parameters or instructions for configuring routing at hosts and edge routers and at least one processor coupled to the memory. The at least one processor is configured to execute the instructions to determine, for an edge router, a plurality of current border gateway protocol (BGP) sessions with external networks and configure a virtual router hosted on the edge router to route a portion of egress traffic to a selected one of the external networks via one of the BGP sessions. The host is configured to route the portion of egress traffic within the public cloud network to the edge router. The edge router is configured to route, by the virtual router, the portion of egress traffic from the edge router to the selected one of the external networks. The edge router includes a software agent configured to periodically inject routing rules into the virtual router based on a ranked list of routes for the portion of egress traffic.

In some implementations, the egress traffic manager is configured to measure a latency between the edge router and a destination via one or more of the external networks and configure the virtual router based on at least the latency for the selected one of the external networks.

In some implementations, the edge router is configured to route a second portion of egress traffic at the edge router to one or more of the external networks using a default virtual router configured with static routing rules.

In some implementations, the host is configured to encapsulate the portion of egress traffic at the host and the virtual router is configured to decapsulate the portion of egress traffic at the virtual router.

In some implementations, the portion of egress traffic is for a service hosted on the host in the public cloud network for a client. The virtual router may be dedicated to traffic for the client.

In some implementations, the external networks include internet service providers.

In some implementations, the egress traffic manager is configured to select the virtual router for the portion of egress traffic based on at least a destination for the portion of egress traffic. Selecting the virtual router for the portion of egress traffic may be further based on network telemetry.

In some implementations, the portion of egress traffic is defined by a 5-tuple and type of service field in a header of packets in the egress traffic.

In another example, the disclosure provides a method of egressing traffic from a public cloud network. The method includes determining, for an edge router, a plurality of current BGP sessions with external networks. The method includes configuring a virtual router hosted on the edge router to route a portion of egress traffic to a selected one of the external networks via one of the BGP sessions. Configuring the virtual router includes periodically providing a ranked list of routes for the portion of egress traffic to the virtual router. The method includes routing the portion of egress traffic from a host within the public cloud network to the edge router. The method includes routing, by the virtual router, the portion of egress traffic from the edge router to the selected one of the external networks.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to egress traffic routing in a public cloud network. Because a public cloud network may be accessed via the Internet, a cloud service provider may not control an end-to-end path between a client and a host for a service. For example, traffic for the public cloud network may traverse one or more Internet Service Providers (ISPs) between the client and an edge of the public cloud network. Accordingly, a client or a user of a client device may associate delays in routing over the Internet with a quality of the public cloud network.

Although a public cloud network does not have control over routing within or between the ISPs, the public cloud network may control routing of egress traffic within the public cloud network. For example, the public cloud network may select an edge router within the public cloud network and a first external network to receive the egress traffic. In an aspect, the present disclosure provides techniques for efficiently routing a portion of egress traffic (e.g., traffic for a service) from a host to a selected edge router and from the selected edge router to a preferred external network. For example, an egress traffic manager may configure hosts and edge routers to route egress traffic along a selected route. The disclosed techniques allow the selected routes to be dynamically updated. Accordingly, the routes may be adapted based on network conditions. For example, if latency for traffic over a particular ISP increases, the public cloud network may select a different external network to receive the egress traffic. Further, the disclosed techniques may make use of commodity routers that are currently deployed in existing public cloud networks without a need to implement custom software on the routers or replace edge infrastructure with a networking stack running on servers. Instead, the disclosed techniques may make use of existing router virtualization capabilities of the commodity routers to configure virtual routers to handle a specified portion of traffic (e.g., for a specific service). The commodity routers may continue to handle regular traffic using a default virtual router.

Figure 3:
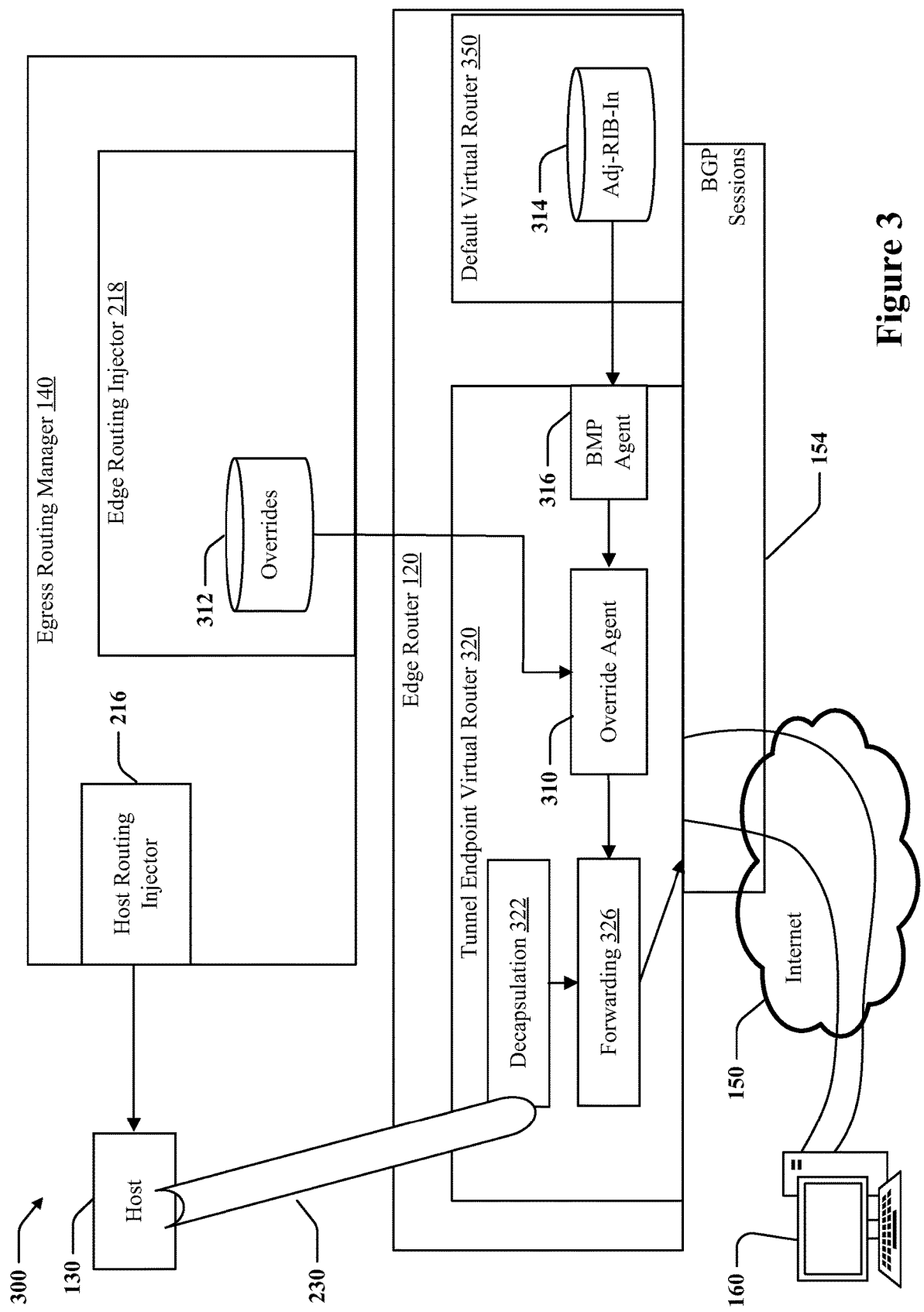
FIG. 3 is a diagram of an example of an edge router for egress routing from a public cloud network, in accordance with aspects described herein.
Figure 4:
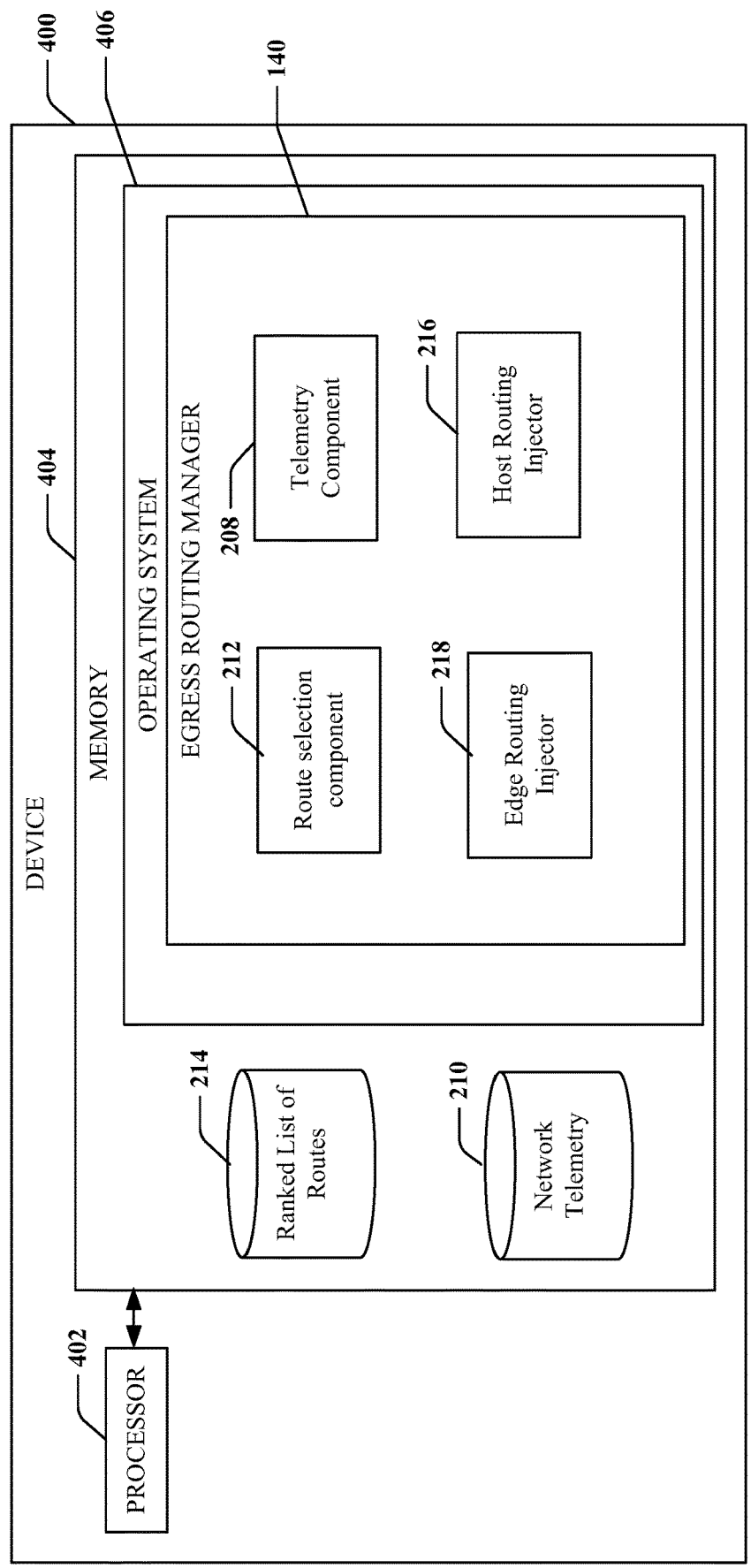
FIG. 4 is a schematic diagram of an example of a device for egress routing from a public cloud network, in accordance with aspects described herein.
Figure 5:
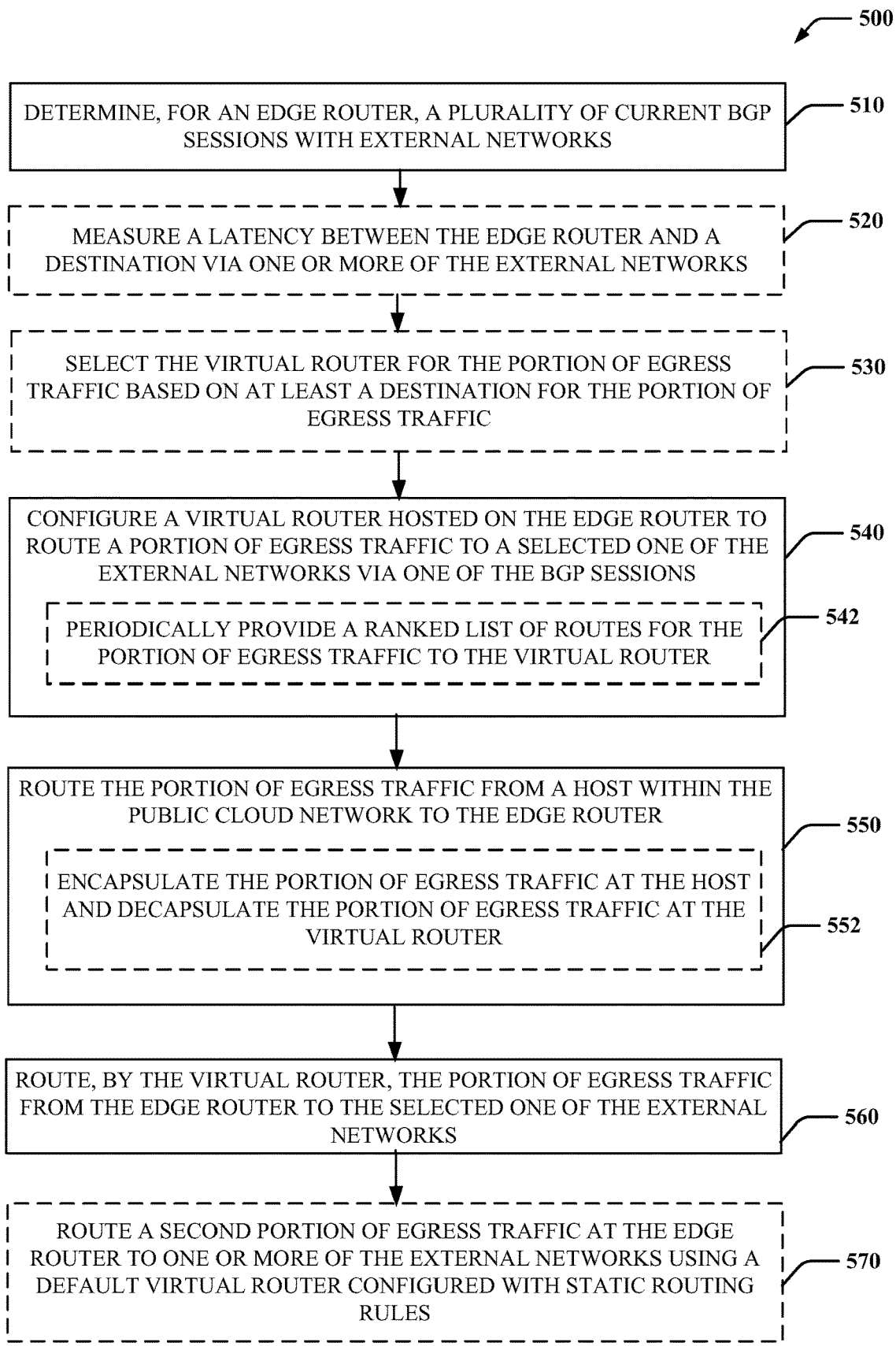
FIG. 5 is a flow diagram of an example of a method of egress routing from a public cloud network, in accordance with aspects described herein.

Turning now to FIGS. 1-6, examples are depicted with reference to one or more components and one or more methods that may perform the actions or operations described herein, where components and/or actions/operations in dashed line may be optional. Although the operations described below in FIG. 5 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
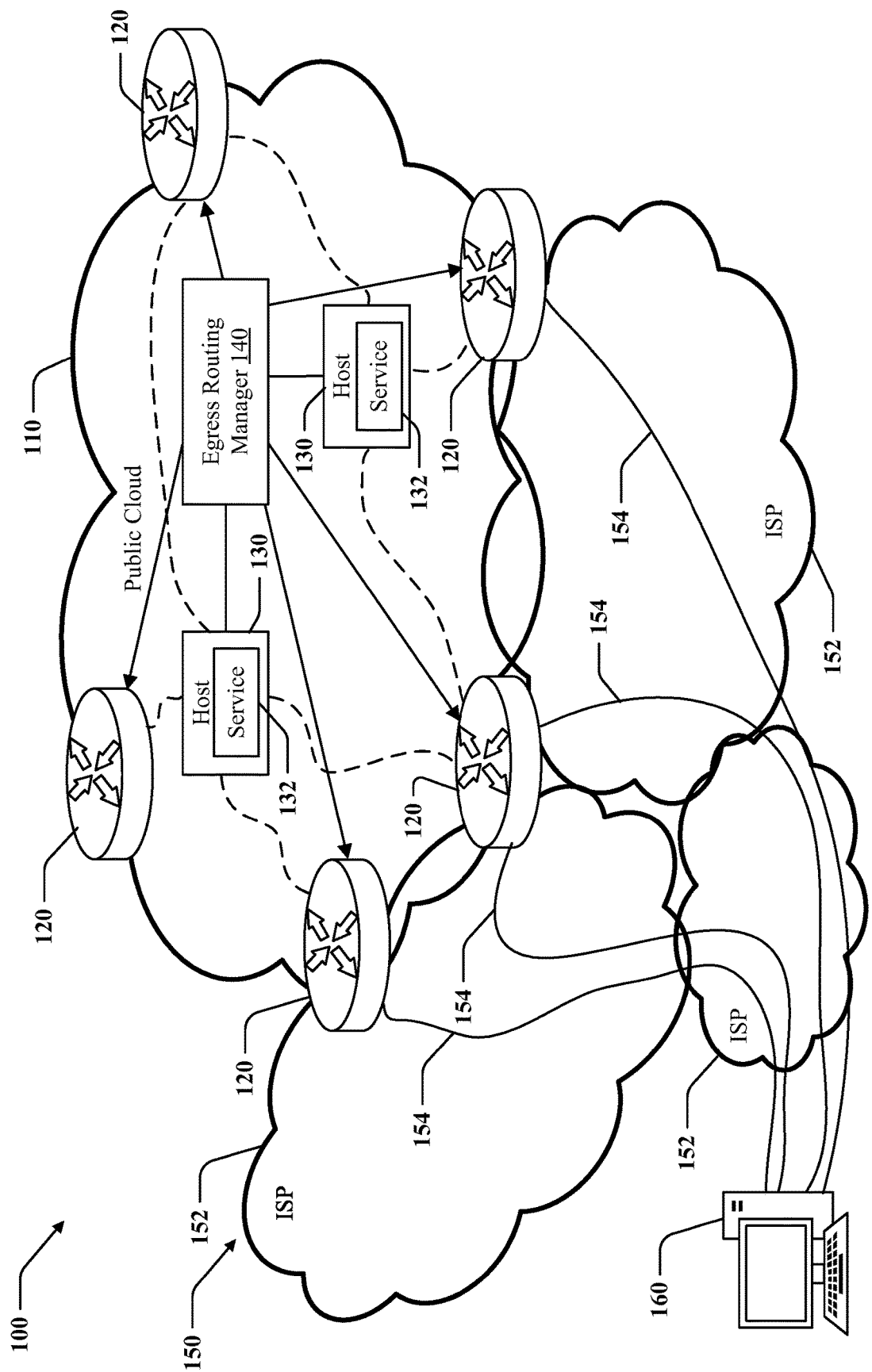
FIG. 1 is a diagram of an example of an architecture for egress routing from a public cloud network, in accordance with aspects described herein.

FIG. 1 is a conceptual diagram 100 of an example of an architecture for a public cloud network 110. The public cloud network 110 may include computing resources that are controlled by a network operator and accessible to public clients 160 via an internet 150. For example, the public cloud network 110 may include a plurality of hosts 130 that host services 132. Each host 130 may be, for example, a virtual machine on a computing resource such as a server located in a datacenter. The public cloud network 110 may include edge routers 120 that connect the hosts 130 to external networks 152 such as internet service providers (ISPs) that form the internet 150. The network operator may charge a client 160 to access the public cloud network 110 and/or charge a service operator (e.g., a web application) for hosting a service 132.

In an example use case, the client 160 may make a request to a service 132. The host 130 of the service 132 may process the request according to the service and send traffic to the client 160 and/or another client associated with the service 132. As illustrated, the architecture of the public cloud network 110 may include numerous paths between the host 130 and a client 160. The paths may include an internal portion within the public cloud network 110 (e.g., from the host 130 to an edge router 120) that is entirely under control of the operator of the public cloud network 110. The paths may also include an external portion (e.g., from the edge router 120 to the client 160) that is controlled by the external networks 152 that form the internet 150. Conventionally, routing over an internet 150 is performed on a best-efforts basis. The host 130 may egress traffic based on static routing rules. For example, the static routing rules may define a path that will eventually reach the client 160. Similarly, routing within the internet 150 may be performed on a best-efforts basis, where external networks 152 may select a route for traffic using static routing rules, for example, based on cost.

In an aspect, routing of egress traffic from a public cloud network may be improved by selecting a route for traffic of a service 132. The public cloud network 110 may include an egress routing manager 140 that is configured to determine both an internal portion and an external portion of a path. The egress routing manager 140 may configure tunneling to route a portion of egress traffic from a host 130 to a selected edge router 120. The portion of egress traffic may be defined by a 5-tuple and type of service field in a header of packets in the egress traffic. The egress routing manager 140 may configure an edge router 120 with a virtual router that handles a portion of traffic received via the tunnel and routes the portion of traffic to an external network. Each external network 152 (e.g., an ISP) may be associated with a border gateway protocol (BGP) session 154 for the edge router 120, and the egress routing manager 140 may select the external network based on the BGP sessions 154.

Figure 2:
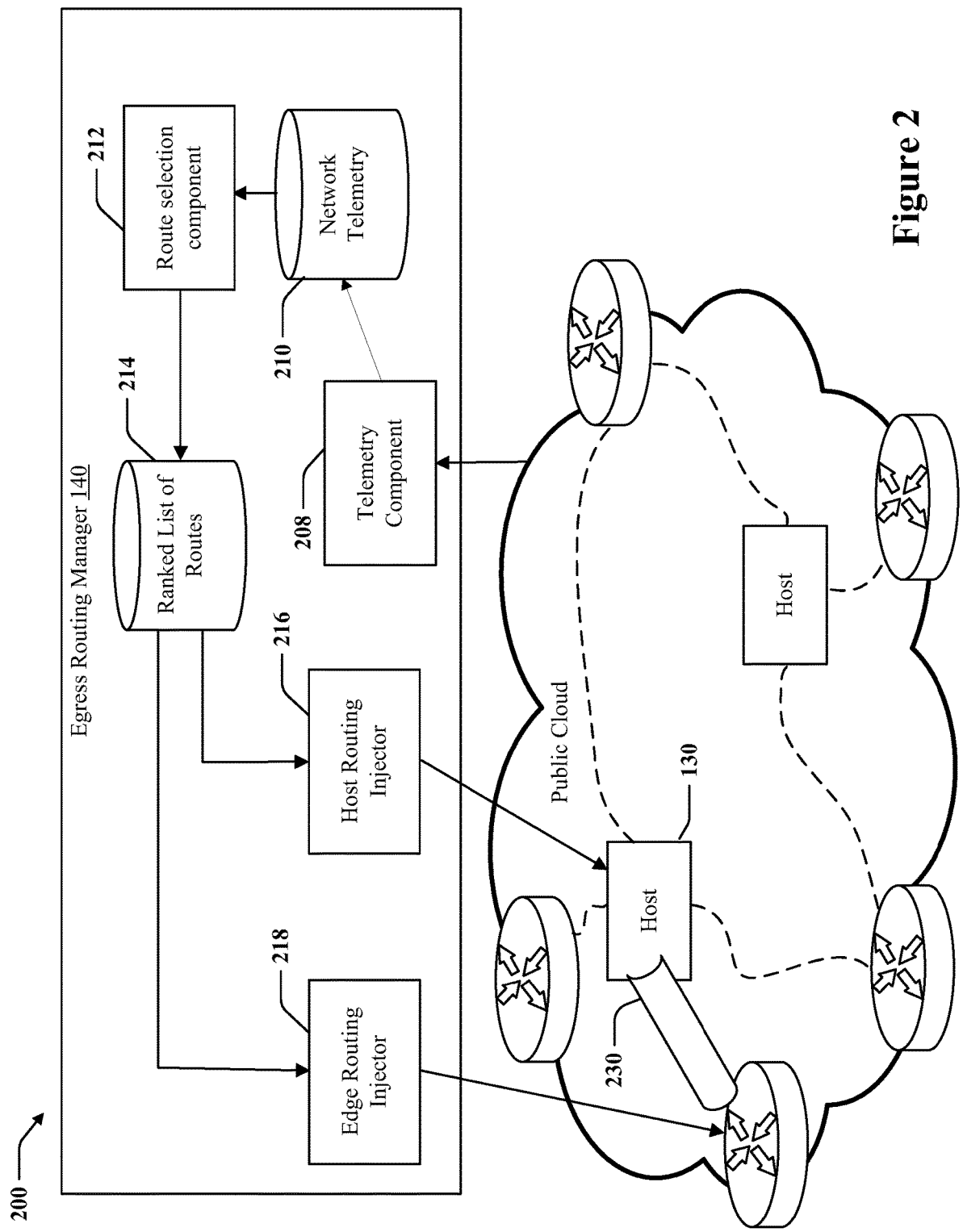
FIG. 2 is a diagram of an example of an egress routing manager, in accordance with aspects described herein.

FIG. 2 is a diagram 200 of an example of the egress routing manager 140. The egress routing manager 140 may include a telemetry component 208, network telemetry datastore 210, a route selection component 212, a ranked list of routes 214, a host routing injector 216, and an edge routing injector 218.

The egress routing manager 140 and/or telemetry component 208 may receive network telemetry data from the various computing resources (e.g., hosts 130 and edge routers 120) of the public cloud network and store the network telemetry data in the network telemetry datastore 210. For example, the telemetry component 208 may measure a latency between each edge router 120 and a destination (e.g., client 160) via one or more of the external networks 152. The network telemetry datastore may include network telemetry data from route anomaly detection and remediation (RADAR), border management protocol (BMP), simple network management protocol (SNMP), internet protocol flow information export (IPFIX), or other network monitoring systems or protocols. The network telemetry datastore 210 may provide the network telemetry data to the route selection component 212.

The route selection component 212 may receive the network telemetry data from the network telemetry datastore 210. The route selection component 212 may generate the ranked list of routes 214. The route selection component 212 may implement various algorithms selected by the network operator for ranking routes. The selected algorithm may depend on requirements of a client. For example, the route selection component 212 may be configured to rank routes based on latency. The route selection component 212 may determine a latency associated with each node and connection for various paths from the host to the client 160. The route selection component 212 may output the ranked list of routes 214 based on the lowest total latency for each route. In some implementations, the route selection component 212 may consider other characteristics such as bandwidth or cost of a route. The route selection component 212 may be configured with weights corresponding to multiple characteristics to rank the routes. The ranked list of routes 214 may be available to a host routing injector 216 and an edge routing injector 218.

The host routing injector 216 may configure a host 130 to forward egress traffic for a service to a specified edge router 120. In some implementations, the host routing injector 216 may establish a tunnel 230 between the host 130 and the edge router 120. For example, the host 130 may encapsulate egress traffic for the service, and any nodes between the host 130 and edge router 120 may be configured to forward the encapsulated traffic from the host 130 to the edge router 120.

FIG. 3 is a diagram 300 of an example of an edge router 120 for egress routing from a public cloud network 110, in accordance with aspects described herein. Further details of the egress routing manager 140, edge routing injector 218, and edge router 120 are shown. The edge router 120 may maintain a BGP session with each external network 152. The edge router 120 may receive advertisements from the external networks 152 and establish a routing information base (Adj-RIB-in) including all of the received information about the external networks. The edge router 120 may include a default virtual router 350 and one or more tunnel endpoint virtual routers 320. A virtual router may refer to any router virtualization technology. For example, a virtual router may include a routing instance or a virtual routing function. In an aspect, the edge router 120 may include a tunnel endpoint virtual router 320 for each service that has established a tunnel 230. The default virtual router 350 may be configured with a static set of routing rules, whereas the tunnel endpoint virtual router 320 may be dynamically configured by the edge routing injector 218. The edge routing injector 218 may include a set of overrides 312 corresponding to the ranked list of routes 214. The tunnel endpoint virtual router 320 may include an override agent 310, a routing information base (Adj-RIB-In) 314, and a BGP monitoring protocol (BMP) agent 316.

The tunnel endpoint virtual router 320 may receive traffic from the respective tunnel 230. The tunnel endpoint virtual router 320 may include a decapsulation component 322 and a forwarding component 326. The edge routing injector 218 may configure the decapsulation component 322 to decapsulate the tunneled traffic based on the tunneling protocol of the host 130. The tunnel endpoint virtual router 320 may have default routing rules that are the same as the static routing rules of the default virtual router 350. The edge routing injector 218 may dynamically configure the forwarding component 326 with overrides 312 and/or withdrawals.

The edge router 120 maintains a BGP session 154 with each of the external networks 152 that form the internet 150. In an implementation, the BGP sessions 154 may be maintained at the default virtual router 350. The default virtual router 350 may populate the Adj-RIB-In based on the BGP sessions 154. The tunnel endpoint virtual router 320 maintains a BMP session with the default virtual router 350. The BMP session updates the BMP agent 316 with an up-to-date replica of an Adj-RIB-in 314 of edge router 120. The override agent 310 may periodically pull overrides from the edge routing injector 218. The override agent 310 may use the Adj-RIB-in 314 to determine whether the route for each override is valid. The override agent 310 may then inject valid routes into the forwarding component 326 (e.g., into a forwarding table) of the tunnel endpoint virtual router 320 using an internal BGP (iBGP) session. In an aspect, only overrides are injected into the tunnel endpoint virtual router 320, which uses the default routes of the default virtual router 350 if no override is applicable. A withdrawal may be used to remove a route from the tunnel endpoint virtual router 320.

FIG. 4 is a schematic diagram of an example of an apparatus 400 (e.g., a computing device) for controlling routing of egress traffic. The apparatus 400 may be implemented as one or more computing devices in the public cloud network 110.

In an example, the apparatus 400 can include a processor 402 and/or memory 404 configured to execute or store instructions or other parameters related to providing an operating system 406, which can execute one or more applications or processes, such as, but not limited to, the egress routing manager 140. For example, processor 402 and memory 404 may be separate components communicatively coupled by a bus (e.g., on a motherboard or other portion of a computing device, on an integrated circuit, such as a system on a chip (SoC), etc.), components integrated within one another (e.g., processor 402 can include the memory 404 as an on-board component), and/or the like. Memory 404 may store instructions, parameters, data structures, etc. for use/execution by processor 402 to perform functions described herein.

In an example, the egress routing manager 140 may include the telemetry component 208, route selection component 212, host routing injector 216, and edge routing injector 218. The network telemetry datastore 210 and ranked list of routes 214 may also be stored in memory 404. The telemetry component 208 may be configured to determine, for an edge router, a plurality of current BGP sessions 154 with external networks 152. The route selection component 212 may select a virtual router hosted on the edge router to route a portion of egress traffic to a selected one of the external networks via one of the BGP sessions. The host routing injector 216 may configure a host 130 to route the portion of egress traffic from a host within the public cloud network to the edge router. The edge routing injector 218 may configure the tunnel endpoint virtual router 320 on the edge router 120 to route the portion of egress traffic from the edge router to the selected one of the external networks.

FIG. 5 is a flow diagram of an example of a method 500 for routing traffic in a public cloud network. For example, the method 500 can be performed by the apparatus 400 and/or one or more components thereof to route egress traffic from hosts 130 in the public cloud network 110.

At block 510, the method 500 includes determining, for an edge router, a plurality of current BGP sessions with external networks. In an example, the telemetry component 208, e.g., in conjunction with processor 402, memory 404, and operating system 406, can determine, for an edge router 120, a plurality of current BGP sessions with external networks 152 (e.g., ISPs).

At block 520, the method 500 optionally includes measuring a latency between the edge router and a destination via one or more of the external networks. In an example, the telemetry component 208, e.g., in conjunction with processor 402, memory 404, and operating system 406, can measure a latency between the edge router 120 and a destination (e.g., client 160) via one or more of the external networks 152.

At block 530, the method 500 optionally includes selecting the virtual router for the portion of egress traffic based on at least a destination for the portion of egress traffic. In an example, the route selection component 212, e.g., in conjunction with processor 402, memory 404, and operating system 406, can select the virtual router 320 for the portion of egress traffic based on at least a destination (e.g., client 160) for the portion of egress traffic.

At block 540, the method 500 includes configuring a virtual router hosted on the edge router to route a portion of egress traffic to a selected one of the external networks via one of the BGP sessions. In an example, the edge routing injector 218, e.g., in conjunction with processor 402, memory 404, and operating system 406, can configure the virtual router 320 hosted on the edge router 120 to route a portion of egress traffic to a selected one of the external networks 152 via one of the BGP sessions 154. For instance, at sub-block 542, the block 540 may optionally include periodically providing a ranked list of routes 214 for the portion of egress traffic to the virtual router 320.

At block 550, the method 500 includes routing the portion of egress traffic from a host within the public cloud network to the edge router. In an example, the host routing injector 216, e.g., in conjunction with processor 402, memory 404, and operating system 406, can configure the host 130 to route the portion of egress traffic from the host 130 within the public cloud network 110 to the edge router 120. For example, at sub-block 552, the block 550 may optionally include encapsulating the portion of egress traffic at the host and decapsulating the portion of egress traffic at the virtual router. For instance, the host 130 may encapsulate the portion of egress traffic for the tunnel 230. At the virtual router 320, the decapsulation component 322 may decapsulate the portion of egress traffic from the tunnel 230.

At block 560, the method 500 includes routing, by the virtual router, the portion of egress traffic from the edge router to the selected one of the external networks. In an example, the edge routing injector 218, e.g., in conjunction with processor 402, memory 404, and operating system 406, can configure the edge router 120 to route, by the virtual router 320, the portion of egress traffic from the edge router 120 to the selected one of the external networks 152.

At block 570, the method 500 optionally includes routing a second portion of egress traffic at the edge router to one or more of the external networks using a default virtual router configured with static routing rules. In an example, the edge routing injector 218, e.g., in conjunction with processor 402, memory 404, and operating system 406, can configure the edge router 120 to route a second portion of egress traffic at the edge router 120 to one or more of the external networks 152 using a default virtual router 350 configured with static routing rules.

Figure 6:
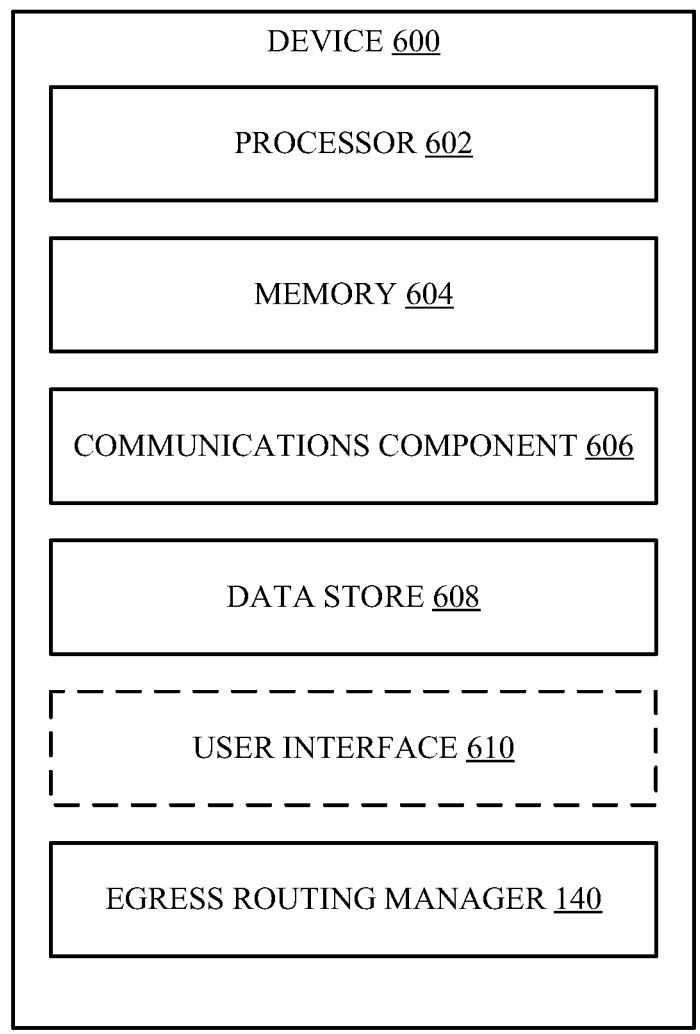
FIG. 6 is a schematic diagram of an example of a device for performing functions of egress routing described herein, in accordance with aspects described herein.

FIG. 6 illustrates an example of a device 600 including additional optional component details as those shown in FIG. 4. In one aspect, device 600 may include processor 602, which may be similar to processor 402 for carrying out processing functions associated with one or more of components and functions described herein. Processor 602 can include a single or multiple set of processors or multi-core processors. Moreover, processor 602 can be implemented as an integrated processing system and/or a distributed processing system.

Device 600 may further include memory 604, which may be similar to memory 404 such as for storing local versions of operating systems (or components thereof) and/or applications being executed by processor 602, such as the egress routing manager 140, the telemetry component 208, the route selection component 212, the host routing injector 216, the edge routing injector in 218, etc. Memory 604 can include a type of memory usable by a computer, such as random access memory (RAM), read only memory (ROM), tapes, magnetic discs, optical discs, volatile memory, non-volatile memory, and any combination thereof.

Further, device 600 may include a communications component 606 that provides for establishing and maintaining communications with one or more other devices, parties, entities, etc. utilizing hardware, software, and services as described herein. Communications component 606 may carry communications between components on device 600, as well as between device 600 and external devices, such as devices located across a communications network and/or devices serially or locally connected to device 600. For example, communications component 606 may include one or more buses, and may further include transmit chain components and receive chain components associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with aspects described herein. For example, data store 608 may be or may include a data repository for operating systems (or components thereof), applications, related parameters, etc. not currently being executed by processor 602. In addition, data store 608 may be a data repository for the egress routing manager 140.

Device 600 may optionally include a user interface component 610 operable to receive inputs from a user of device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Device 600 may additionally include a egress routing manager 140 for routing traffic from a host 130 in a public cloud network 110, a telemetry component 208 for determining, for an edge router, a plurality of current BGP sessions with external networks, a route selection component 212 for configuring a virtual router hosted on the edge router to route a portion of egress traffic to a selected one of the external networks via one of the BGP sessions, a host routing injector 216 for configuring the host 130 to route the portion of egress traffic from the host within the public cloud network to the edge router, and an edge routing injector 218 for configuring the edge router 120 with the virtual router 320 for routing the portion of egress traffic from the edge router to the selected one of the external networks, etc.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A system for egressing traffic from a public cloud network, comprising:
an egress traffic manager including a memory storing one or more parameters or instructions for configuring routing at hosts and edge routers and at least one processor coupled to the memory, wherein the at least one processor is configured to execute the instructions to:
determine, for an edge router, a plurality of current border gateway protocol (BGP) sessions with external networks; and
configure a virtual router hosted on the edge router to route a portion of egress traffic to a selected one of the external networks via one of the BGP sessions;
a host configured to route the portion of egress traffic within the public cloud network to the edge router; and
the edge router configured to route, by the virtual router, the portion of egress traffic from the edge router to the selected one of the external networks, wherein the edge router includes a software agent configured to periodically inject routing rules into the virtual router based on a ranked list of routes for the portion of egress traffic from the egress traffic manager.

2. The system of claim 1, wherein the egress traffic manager is configured to measure a latency between the edge router and a destination via one or more of the external networks and configure the virtual router based on at least the latency for the selected one of the external networks.

3. The system of claim 1, wherein the edge router is configured to route a second portion of egress traffic at the edge router to one or more of the external networks using a default virtual router configured with static routing rules.

4. The system of claim 1, wherein the host is configured to encapsulate the portion of egress traffic at the host and the virtual router is configured to decapsulate the portion of egress traffic at the virtual router.

5. The system of claim 1, wherein the portion of egress traffic is for a service hosted on the host in the public cloud network for a client.

6. The system of claim 5, wherein the virtual router is dedicated to traffic for the client.

7. The system of claim 1, wherein the external networks include internet service providers.

8. The system of claim 1, further wherein the egress traffic manager is configured to select the virtual router for the portion of egress traffic based on at least a destination for the portion of egress traffic.

9. The system of claim 8, wherein selecting the virtual router for the portion of egress traffic is further based on network telemetry.

10. The system of claim 1, wherein the portion of egress traffic is defined by a 5-tuple and type of service field in a header of packets in the egress traffic.

11. A method of egressing traffic from a public cloud network, comprising:
determining, for an edge router, a plurality of current border gateway protocol (BGP) sessions with external networks;
configuring a virtual router hosted on the edge router to route a portion of egress traffic to a selected one of the external networks via one of the BGP sessions, wherein configuring the virtual router comprises periodically providing a ranked list of routes for the portion of egress traffic to the virtual router;

routing the portion of egress traffic from a host within the public cloud network to the edge router; and routing, by the virtual router, the portion of egress traffic from the edge router to the selected one of the external networks.

12. The method of claim 11, further comprising measuring a latency between the edge router and a destination via one or more of the external networks, wherein configuring the virtual router is based on at least the latency for the selected one of the external networks.

13. The method of claim 11, further comprising routing a second portion of egress traffic at the edge router to one or more of the external networks using a default virtual router configured with static routing rules.

14. The method of claim 11, wherein routing the portion of egress traffic from the host within the public cloud network to the edge router comprises encapsulating the portion of egress traffic at the host and decapsulating the portion of egress traffic at the virtual router.

15. The method of claim 11, wherein the portion of egress traffic is for a service hosted in the public cloud network for a client.

16. The method of claim 15, wherein the virtual router is dedicated to traffic for the client.

17. The method of claim 11, wherein the external networks include internet service providers.

18. The method of claim 11, further comprising selecting the virtual router for the portion of egress traffic based on at least a destination for the portion of egress traffic.

19. The method of claim 18, wherein selecting the virtual router for the portion of egress traffic is further based on network telemetry.

20. The method of claim 12, wherein the portion of egress traffic is defined by a 5-tuple and type of service field in a header of packets in the egress traffic.

* * * * *